United States Patent
Lipasti

(10) Patent No.: US 6,487,640 B1
(45) Date of Patent: Nov. 26, 2002

(54) MEMORY ACCESS REQUEST REORDERING TO REDUCE MEMORY ACCESS LATENCY

(75) Inventor: Mikko Herman Lipasti, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,263

(22) Filed: Jan. 19, 1999

(51) Int. Cl.[7] .............................................. G06F 12/00
(52) U.S. Cl. ........................ 711/140; 711/169; 711/122
(58) Field of Search .................................. 711/122, 140, 711/167, 168, 169, 124, 132, 137

(56) References Cited

U.S. PATENT DOCUMENTS

| | | | | |
|---|---|---|---|---|
| 5,790,822 A | * | 8/1998 | Sheaffer et al. | 712/204 |
| 5,802,559 A | * | 9/1998 | Bailey | 711/118 |
| 5,920,710 A | * | 7/1999 | Tan et al. | 712/216 |
| 5,941,983 A | * | 8/1999 | Gupta et al. | 712/214 |
| 5,961,621 A | * | 10/1999 | Wu et al. | 710/107 |
| 6,088,772 A | * | 7/2000 | Harriman et al. | 711/158 |

* cited by examiner

Primary Examiner—Matthew Kim
Assistant Examiner—Matthew D. Anderson
(74) Attorney, Agent, or Firm—Wood, Herron & Evans, LLP

(57) ABSTRACT

A data processing system, circuit arrangement, integrated circuit device, program product, and method reduce the memory access latency of sequences of memory access requests by processing at least one request in a sequence out of order relative to another request based upon whether the other request is likely to be for data maintained in the same organizational block (e.g., a cache line) as data requested by an earlier memory access request in the sequence. Given that multiple requests for data in the same block will collectively hit or miss a given level of memory, whenever a miss occurs as a result of an earlier request, the later requests for data in the same block would otherwise stall until processing of the miss was complete. Thus, by attempting to process other requests prior to processing all of the requests to the same block, overall memory access latency often improves since potentially productive operations can be performed during periods that would otherwise be wasted waiting for a common block of data to be retrieved from a lower level of memory. Among other implementations, request reordering may be used to improve the performance of complex memory instructions that use multiple memory access requests to access a range of contiguous words that span more than one organizational block.

28 Claims, 4 Drawing Sheets

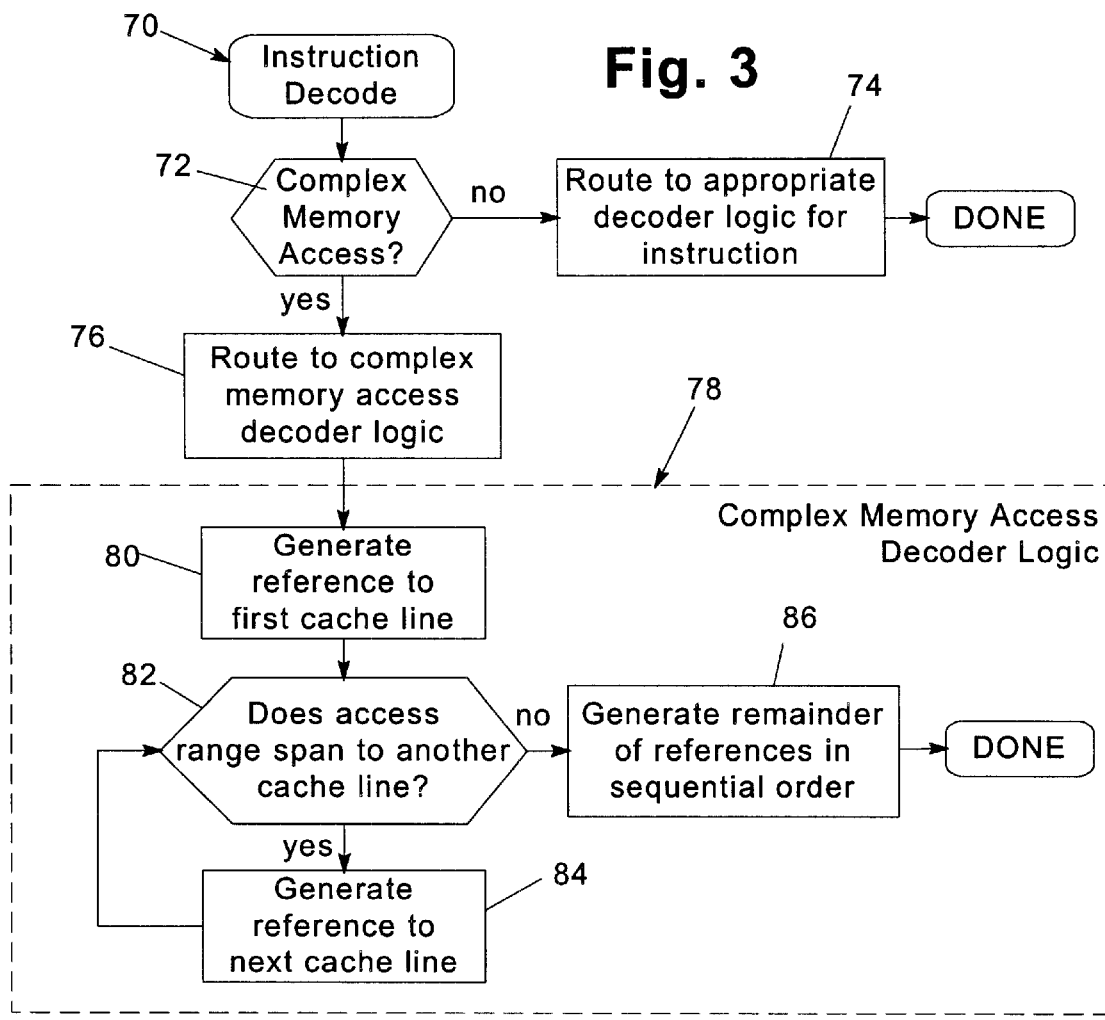
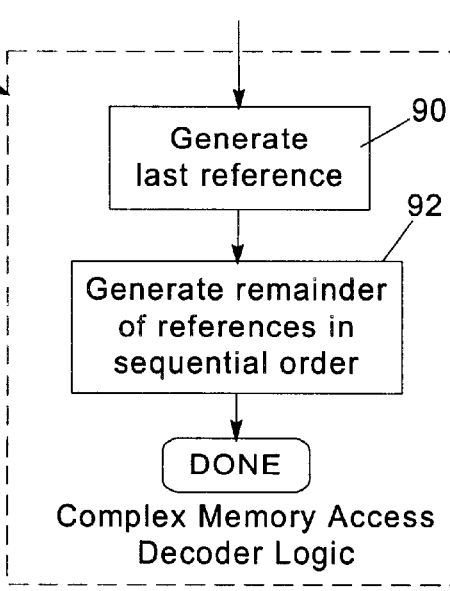
Fig. 5

US 6,487,640 B1

MEMORY ACCESS REQUEST REORDERING TO REDUCE MEMORY ACCESS LATENCY

FIELD OF THE INVENTION

The invention is generally related to data processing systems and processors therefor, and in particular to retrieval of data from a multi-level memory architecture.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on system performance. Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like. In some instances, instructions and data are stored in separate instruction and data cache memories to permit instructions and data to be accessed in parallel. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant performance hit.

Some conventional cache designs are "pipelined", which permits the caches to start subsequent missed memory access requests prior to completion of earlier missed memory access requests. Pipelining reduces memory access latency, or delay, since the handling of cache misses for subsequent memory access requests often does not need to wait until the processing of an earlier miss is complete.

One limitation to cache pipelining arises from the fact that oftentimes memory access requests that are issued closely in time are for data stored in a narrow range of memory addresses, and often within the same cache line. As a result, pipelining may still not effectively reduce memory access latency in some instances because multiple memory access requests may be waiting on the same cache line to be returned from the cache, thus preventing requests for other cache lines from being processed by the cache.

For example, many processors support the use of complex memory instructions that in essence request data from a sequential range of memory addresses. Conventional processor designs typically handle a complex memory instruction by sequentially issuing memory access requests for each memory address in the range specified by the instruction. Moreover, conventional processor designs typically have request queues that are finite in length, so that only a limited number of requests may be pending at any given time.

In many instances, complex memory instructions request data spanning across more than one cache line. A significant performance hit can occur, however, when a portion of the requested data is stored in a cache line other than the first requested cache line, and when that portion of the requested data is not currently stored in the cache. Specifically, with a fixed length request queue, a request for a subsequent cache line may not be issued until after a first cache miss has been completed. No pipelining of the cache misses occurs, and as a result, performance is degraded.

Put another way, assume a complex memory instruction generates a sequence of memory access requests for $0 \ldots N$ words of data starting, for example, at the beginning of a cache line, and that each cache line is capable of storing $n$ words of data. A conventional processor would issue the $0 \ldots N$ memory access requests as follows:

$0, 1, 2, \ldots, n-1, n, n+1, n+2, \ldots, 2n-1, 2n, 2n+1, 2n+2, \ldots N$.

Assuming that memory access request 0 misses the cache, all other memory access requests in the same cache line (requests $1 \ldots n-1$) will also miss. As a result, the request queue will typically fill up with requests that are waiting on the same cache line to be retrieved, thereby stalling the processor until the cache miss is completed. Once the cache line is retrieved, the requests can then be handled in sequence, until such time as the first request for the next cache line (request n) can be issued. Assuming also that this request also misses the cache, the next cache line will need to be retrieved. However, given that the request could not be issued until after the first cache miss was completed, pipelining of the cache misses would not occur. As a result, memory access latency increases and overall performance suffers.

Therefore, a significant need exists in the art for a manner of reducing the memory access latency associated with sequences of closely-spaced memory access requests, particularly with respect to complex memory instructions and the like.

SUMMARY OF THE INVENTION

The invention addresses these and other problems associated with the prior art by providing a data processing system, circuit arrangement, integrated circuit device, program product, and method that reduce the memory access latency of sequences of memory access requests by processing at least one request in a sequence out of order relative to another request based upon whether the other request is likely to be for data maintained in the same organizational block (e.g., a cache line) as data requested by an earlier memory access request in the sequence.

Embodiments of the invention attempt to increase the overall throughput of memory access requests by attempting to process certain memory access requests during times in which other memory access requests might otherwise be stalled. For example, in a multi-level memory architecture where data is passed between memory levels in organizational blocks such as cache lines, it is known that whenever a particular memory access request misses a higher level of memory, any other memory access requests that request data in the same organizational block will likewise miss that level of memory. Consequently, any such other memory access request cannot be processed until the block containing the data requested by the first request is retrieved from a lower level of memory. Therefore, by attempting to process other memory access requests prior to one or more requests directed to data in the same organizational block as a particular request, the likelihood increases that other memory access requests can be processed during any dead time that would otherwise result if that particular request resulted in a miss.

As a result, request throughput and memory access latency are often improved since productive operations can be performed during time periods that would otherwise be wasted while multiple requests were waiting on the same block of data. Moreover, in embodiments that support pipelined processing of misses, processing other memory access requests prior to requests directed to the same organizational block as a particular request oftentimes further reduces memory access latency. In such embodiments, should an out of order request also result in a miss, that later miss can be processed concurrently with the first miss so that the data requested by the out of order request is returned more quickly than would otherwise occur if the out of order request could not be processed until after processing of the first miss was complete.

Among other implementations, request reordering consistent with the invention may be utilized to improve the performance of complex memory instructions that request a plurality of contiguous words spanning more than one organizational block in a multi-level memory architecture. In such implementations, a complex memory instruction may be processed by processing a memory access request for a word in a block other than the first block before processing the memory access requests for all of the words in the first block. Consequently, in the event that any memory access request to the first block results in a miss, the memory access request for the word in the other block is more likely to be processed prior to completion of the processing of the miss, thereby potentially reducing the memory access latency of that request.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the sequence of operations performed during an instruction decode using the system processor of FIG. 2.

FIG. 5 is a flowchart illustrating an alternate sequence of operations performed during an instruction decode to that shown in FIG. 3.

DETAILED DESCRIPTION

The illustrated implementations of the invention generally operate by reordering memory access requests in such a manner that at least one memory access request is processed prior to another memory access request for data in the same organizational block as that for an earlier memory access request. A memory access request is typically used to access data stored in a memory, e.g., for reading and/or modifying the data, and as such may include any combination of control signals utilized to access data stored in a memory. A memory access request in some implementations may be referred to as accessing a "word" of data, which is typically used to represent a basic element of data in a data processing system, e.g., a string of 8, 16, 32, 64, etc. bits depending on the system. Stating that a memory access request is for a word of data, however, does not preclude that memory access request from also accessing additional words of data as well.

By reordering a memory access request, it is not necessary that the order of a request be changed from any previous order. Put another way, it is possible to reorder by initially issuing, dispatching, or otherwise generating a sequence of requests in a particular order that differs from a purely sequential order. In other embodiments, however, it may be desirable to analyze a preexisting sequence of requests and rearrange those requests from that preexisting sequence to effect reordering consistent with the invention.

The illustrated implementations have use in a wide variety of multi-level memory architectures within which data is organized into blocks at least in one level of a memory architecture. For example, a multi-level memory architecture may include one or more levels of cache memory, a main memory and/or other external storage. Moreover, a block may correspond to a cache line, a page, or other organizational partition of data associated with a particular level of memory.

A principal benefit of request reordering consistent with the invention occurs whenever a particular request data in a particular block that "misses" a particular level of memory in a multi-level memory architecture, since other requests often can be processed while other requests that are dependent upon the same block wait for the miss to be serviced. It should be appreciated that a request that misses a higher level of memory typically requires that the block corresponding to the request be retrieved from a lower level of memory, often displacing other data stored in the higher level of memory, and often requiring that the other data to be copied back into the lower level of memory.

Exemplary Hardware Environment

Figure 1:
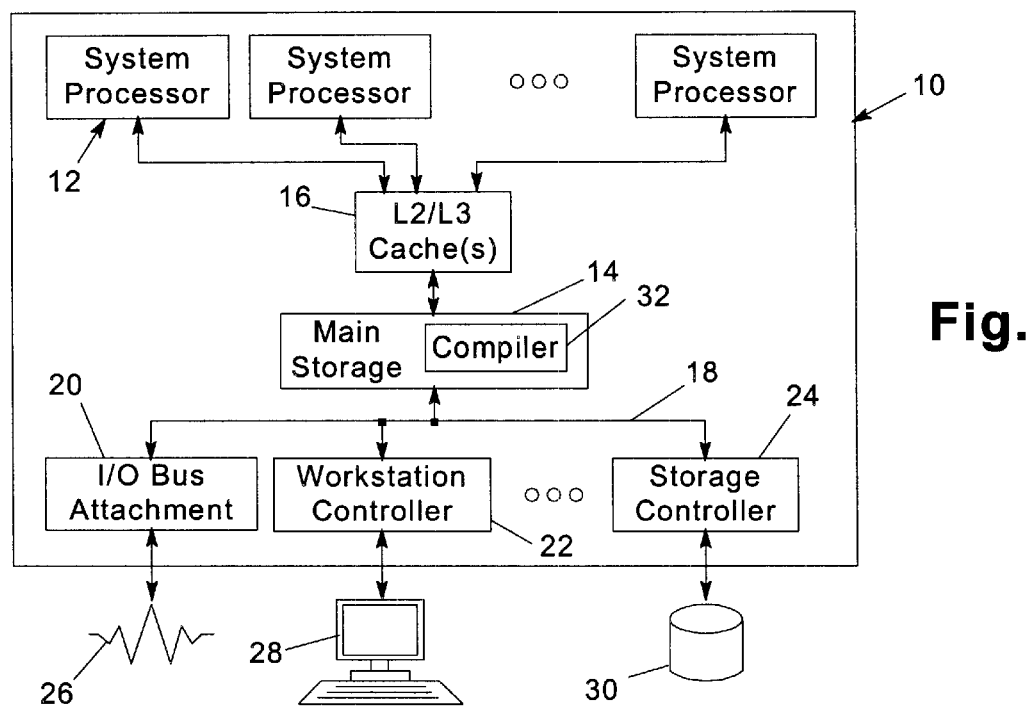
FIG. 1 is a block diagram of a data processing system consistent with the invention.

Turning to the Drawings, wherein like numbers denote like parts throughout the several views, FIG. 1 illustrates a data processing system 10 consistent with the invention. System 10 generically represents, for example, any of a number of multi-user computer systems such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other computing devices such as embedded controllers and the like. One suitable implementation of data processing system 10 is in a midrange computer such as the AS/400 computer available from International Business Machines Corporation.

Data processing system 10 generally includes one or more system processors 12 coupled to a memory subsystem including main storage 14, e.g., an array of dynamic random access memory (DRAM). Also illustrated as interposed between processors 12 and main storage 14 is a cache system 16, typically including one or more levels of data, instruction and/or combination caches, with certain caches either serving individual processors or multiple processors as is well known in the art. Furthermore, main storage 14 is coupled to a number of types of external devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

Memory access request reordering consistent with the invention is typically implemented in a circuit arrangement on a system processor or other programmable integrated circuit device, and it should be appreciated that a wide variety of programmable devices may utilize memory access request reordering consistent with the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

The principal implementation discussed below performs memory access request reordering in a hardware environment, e.g., within request reordering logic circuitry disposed within a system processor 12. As will be discussed in greater detail below, however, memory access request reordering consistent with the invention may also be implemented in a software environment, e.g., within a compiler 32 illustrated as resident in main storage 14. All or part of the program code implementing compiler 32 may be resident from time to time in other components in data processing system 10, e.g., within any of the caches in cache system 16, within DASD 30, and/or within any of system processors 12, among others.

It should be appreciated that data processing system 10 is merely representative of one suitable environment for use with the invention, and that the invention may be utilized in a multitude of other environments in the alternative. The invention should therefore not be limited to the particular implementations discussed herein.

Request Reordering for Complex Memory Instructions

Figure 2:
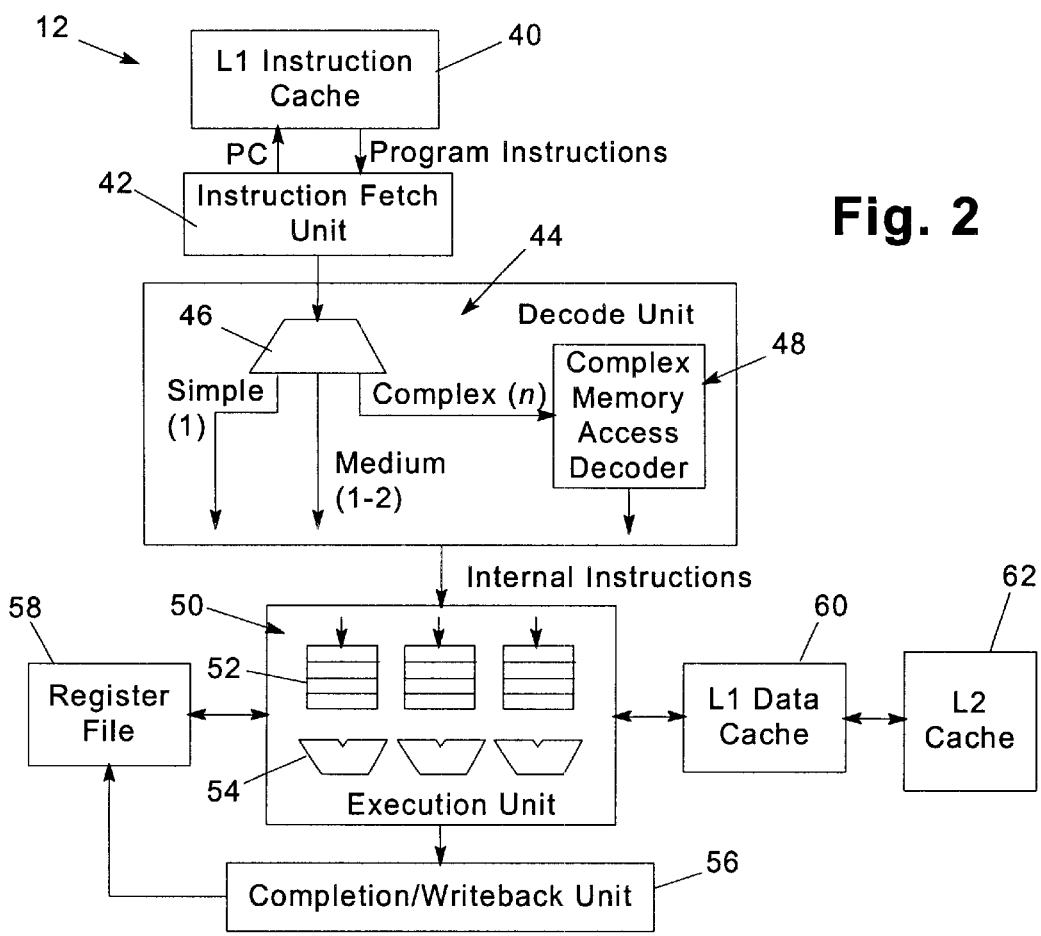
FIG. 2 is a block diagram of one of the system processors in the data processing system of FIG. 1.

FIG. 2 illustrates the primary instruction fetching, decoding and execution components in one of system processors 12, representing a hardware-based implementation of the invention in which memory access request reordering is implemented in the processing of complex memory instructions. Complex memory access instructions are typically instructions that request access to data words stored in multiple memory addresses, e.g., within a range of memory addresses defining a plurality of contiguous words. For example, in the PowerPC architecture, complex memory access instructions are represented by the load multiple (lmw, lmd), store multiple (stmw, stmd), load string (lsdi, lsdx, lswi, lswx) and store string (stsdi, stsdx, stswi, stswx) instructions. Such complex memory access instructions are typically processed in a system processor such as a microprocessor by generating and executing a sequence of microcoded internal instructions referred to herein as memory access requests, with each request used to access one or more words from the plurality of contiguous words specified by the complex memory instruction. However, it should be appreciated from a reading of the disclosure herein that other implementations may utilize request reordering consistent with the invention. Therefore, the invention should not be limited to use solely with processing complex memory instructions and the like.

As shown in FIG. 2, program instructions from a computer program to be executed are typically fetched from the memory subsystem (including main storage 14 and caches 16 of FIG. 1), to an instruction cache 40 in response to requests from an instruction fetch unit 42. Typically, such instructions are retrieved in response to the value stored in a program counter (PC) in unit 42. Fetched instructions are then decoded by a decode unit 44 into one or more internal microcoded instructions.

The decode unit typically has a number of decoder logic blocks for handling different types of instructions. A determination of what decoder logic block is appropriate for a particular instruction is typically made by an instruction router represented at 46. For example, one subset of instructions, memory access instructions, may be routed based upon the number of microcoded internal instructions (here individual memory access requests) that will likely be generated to process the current instruction, e.g., based upon whether a memory access instruction is deemed to be of a type that is "simple" (one internal instruction), "medium" (one to two internal instructions), or "complex" (more than two internal instructions).

For complex memory access instructions, such instructions are routed to a complex memory access decoder logic block 48 for handling. Other instructions are routed to appropriate decoder logic blocks as appropriate; however, such other logic blocks are not shown in FIG. 2 as they are not particularly relevant to an understanding of the invention.

The internal instructions generated by complex memory access decoder logic block 48, as well as any other decoder logic blocks in decode unit 44, are provided to one or more execution units 50 via an operation known as issuing, as is well known in the art. Each execution unit typically includes one or more pipelines fed by dedicated or shared queues or windows 52, each of which feeds appropriate instruction execution logic represented at 54. Execution results are typically fed to a completion/write back unit 56, which stores such results in one or more register files 58 that are manipulated by execution unit 50. Moreover, each execution unit 50 also typically accesses data stored in the memory architecture, e.g., via an L1 data cache 60 interfaced with an L2 cache 62.

As is known in the art, each of decode unit 44, execution unit 50 and L1 data cache 60 may include queuing arrangements that store pending instructions to be processed by such units. Each such queuing arrangement typically has a fixed length representing the maximum number of pending instructions that can be stored in the arrangement at one time. When a queuing arrangement is full, however, no additional instructions can be stored in the arrangement until another pending instruction is handled by the appropriate unit. As such, any unit that is required to forward an instruction to another unit having a full queuing arrangement typically must be stalled until space becomes available. Moreover, in the illustrated implementation, the L1 data cache is pipelined such that multiple stages of more than one cache miss operation can be processed at any given time. Put another way, the L1 data cache is capable of initiating a cache miss for a second request prior to completing a cache miss for a first request. The use and implementation of queuing mechanisms and pipelining within system processors and caches is well known in the art, and thus need not be discussed in any greater detail herein.

In the hardware-based implementation discussed hereinafter, request reordering consistent with the invention is performed to reduce the impact of misses to L1 data cache 60, which typically require the retrieval of data via the L2 cache 62, and thus the form of organizational block used in request reordering corresponds to the cache line size in the L1 cache. However, it should be appreciated that request reordering can be utilized in other memory architectures, as well as different levels of memory, and thus, the invention should not be limited to the particular primary cache implementation discussed herein.

It should be appreciated that the architecture of system processor 12 is but one suitable processor implementation consistent with the invention. Other processor architectures may also be used in the alternative.

Turning to FIG. 3, the general sequence of operations performed by decode unit 44 in decoding an instruction is represented at 70. First, in block 72, it is determined whether an instruction to be decoded is a complex memory access instruction. If not, the instruction is forwarded the appropriate decoder logic block therefor (block 74) and handled in an appropriate manner to complete decoding of the instruction. Returning to block 72, if the instruction is a complex memory access instruction, however, the instruction is routed in block 76 to complex memory access decoder logic block 48 (FIG. 2). It should be appreciated that the functionality of blocks 72–76 is typically implemented within instruction router 46 (FIG. 2).

The complex memory access instruction forwarded to decoder logic block 48 typically specifies a range of memory addresses to be accessed, which in the illustrated implementation are accessed via a plurality of memory access requests, or references, that each specify a single word within the range of memory addresses to be accessed. In a conventional design, the memory access requests are typically arranged sequentially—that is, the requests are decoded and issued starting at the lowest word in the range, then proceeding through each subsequent word in order until the entire range has been requested.

In the implementation described herein, on the other hand, the memory access requests are reordered, i.e., decoded and issued in a non-sequential order. Specifically, in the implementation of FIG. 3, memory access requests to each cache line represented in a sequence of requests are ordered at the beginning of the sequence of requests such that any cache misses that may result for any cache line are initiated as quickly as possible. Put another way, assume as with the conventional implementation discussed above as background, a complex memory instruction generates a sequence of memory access requests for 0 . . . N words of data starting, for example, at the beginning of a cache line, and that each cache line is capable of storing n words of data. The sequence of operations shown in FIG. 3 would generate and issue the 0 . . . N memory access requests as follows:

0, n, 2n, . . . M, 1, 2, . . . , n−1, n+1, n+2, . . . , 2n−1, 2n+1, 2n+2, . . . M+1, M+2, . . . . N.

where M=(N−N MOD n), or the first word in the last cache line for the access range.

As shown in FIG. 3, upon forwarding the instruction to decoder logic block 48, a sequence of operations represented at 78 are performed by the decoder logic block. First, in block 80, a reference, or memory access request, is generated for a word in the first cache line. Next, in block 82, the decoder logic block determines whether the access range spans to a second cache line, e.g., by computing the address of the beginning of the next cache line and checking to see if it is less than or equal to the address of the last word N. If so, control passes to block 84 to generate a reference, or memory access request, to the next (second) cache line—typically to the first word in that cache line.

Control then returns to block 82 to determine whether the access range spans yet another cache line, and if so, passes control to block 84 to generate another reference to that additional cache line (typically, to the first word in that line). As a result, a reference to each cache line represented in the access range is generated initially such that all cache lines are accessed as quickly as possible.

Once references to all cache lines have been generated, control then passes from block 82 to block 86 to generate the remainder of the references for the access range in a sequential order, and decoding of the complex memory access instruction is then complete. Also, while not shown in FIG. 3, the generated references are issued to the appropriate execution unit in the order generated. Moreover, it should be appreciated that the development and use of a suitable hardware design that implements the functionality described herein for the complex memory access decoder logic block would be well within the ability of one of ordinary skill in the art having the benefit of the instant disclosure.

Figure 4A:
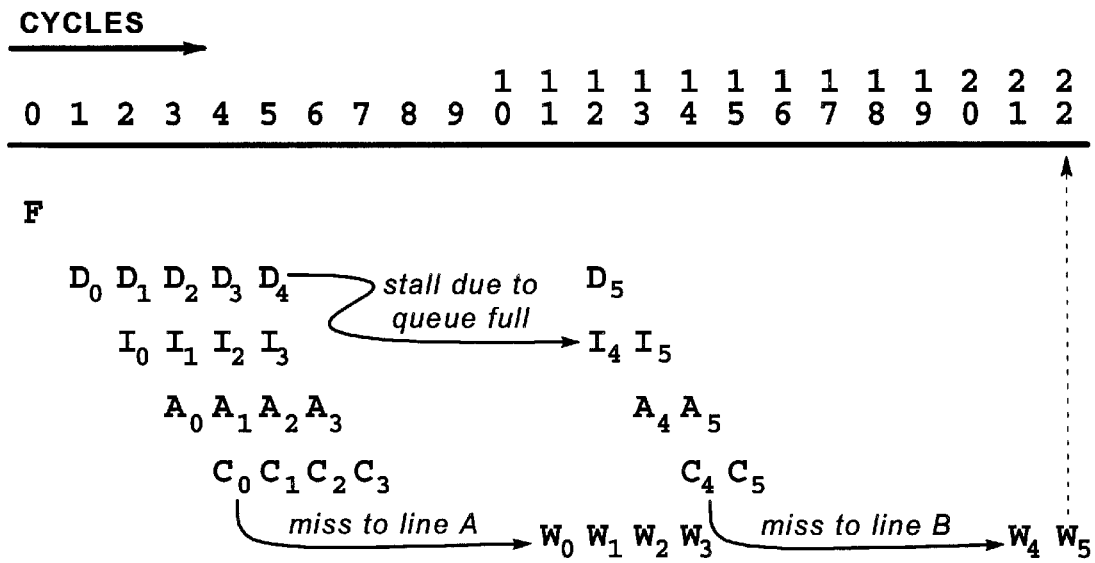
FIG. 4A illustrates the timing sequence for the processing of an exemplary complex memory access instruction by a conventional system processor.
Figure 4B:
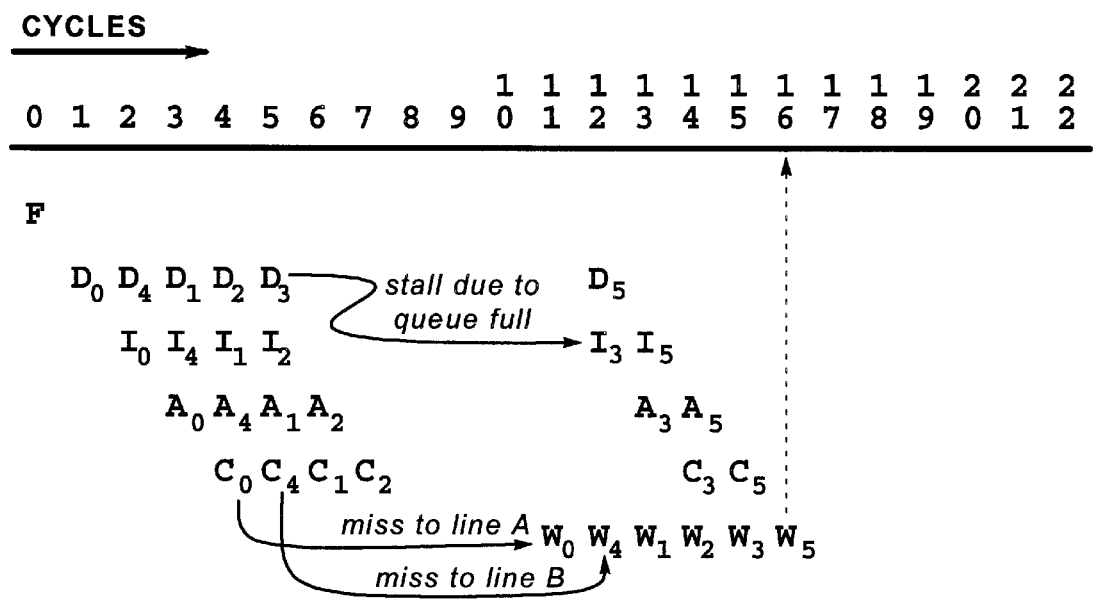
FIG. 4B illustrates the timing sequence for the processing of the exemplary complex memory access instruction of FIG. 4A according to the sequence of operations of FIG. 3.

Turning now to FIGS. 4A and 4B, these figures respectively illustrate the timing sequences that would occur for an exemplary complex memory access instruction that specifies a range of six words in a system that utilizes 4-word cache lines in the L1 data cache. The references to these six words are denoted with the subscripts 0–5, with the first four words {0,1,2,3} incorporated in a first cache line A, and the last two words {4,5} incorporated in a second cache line B. It is also assumed in this example that a load queue in the L1 data cache has a depth of four, meaning that a maximum of four misses can be pending at any given time in the cache, and that the miss penalty in six cycles to retrieve data from the L2 cache.

The system processor upon which each complex memory access instruction is assumed to operate in several stages, including a fetch stage (F), a decode stage (D), an issue stage (I) and an execution stage that is represented in the example by several stages relevant to the handling of memory access requests, namely a compute address stage (A), a cache access stage (C) and a write back result stage (W).

In a conventional design, as represented in FIG. 4A, the complex memory access request instruction is fetched in cycle 0, and the decode logic then attempts to subsequently decode and generate a sequence of references, represented at $D_0$, $D_1$, $D_2$, $D_3$, $D_4$ and $D_5$. The first reference {0} is decoded in cycle 1 and issued in cycle 2 (represented at $D_0$ and $I_0$), and execution thereof begins in cycle 3 with the computation of the address, represented at $A_0$, followed by a cache access in cycle 4, represented at $C_0$. Now, assuming cache line A misses the cache, an additional delay of six cycles occurs prior to writing back the result of the access in cycle 11, represented at $W_0$.

Subsequent references are pipelined behind the first reference and are executed in the same manner, only delayed by one or more stages in the pipeline. However, given that each of the remaining references to cache line A, references { 1, 2, 3}, also miss the L1 data cache, the load queue in the L1 data cache will fill with these additional missed references in cycles 5, 6 and 7, represented at $C_1$, $C_2$ and $C_3$. Moreover, when the load queue fills, the decode and execution units stall, preventing the decode unit from issuing reference {4} or decoding reference {5} until the load queue again becomes available.

The load queue does not become available until the completion of the miss operation on reference {0} in cycle 11. Thus, beginning at cycle 12, issuing of reference {4}, and decoding of reference {5} may be performed. For reference {4}, therefore, the address is computed in cycle 13 ($A_4$) and the cache is accessed in cycle 14 ($C_4$). For reference {5}, each corresponding operation is delayed one cycle relative to reference {4}.

Since references {1,2,3} are directed to the same cache line as reference {0}, the results of these references will be written back in the cycles immediately subsequent to the write back stage for reference {0}, namely during stages 12, 13 and 14. However, assuming that cache line B is also not in the L1 data cache, reference {4} will miss the cache, resulting in a cache miss that delays write back of reference {4} by six cycles, to 21 cycles ($W_4$). Again, reference {5} is delayed one cycle, resulting in a write back of the final reference for the complex memory instruction ($W_5$) occurring in cycle 22.

Now turning to FIG. 4B, the performance improvement offered by reordering the sequence of references according to the sequence of operations set forth in FIG. 3 is shown. Here, the decode logic attempts to issue the references in the order {0,4,1,2,3,}, with the first reference to the second cache line ordered immediately after the first reference to the first cache line. As with a conventional design, the load queue on the L1 data cache will fill after four references miss the cache, stalling the processor with only reference {5} yet to be passed to the decode stage, and with the next to last reference (here reference {3}) stalled in the decode stage.

As above, a miss resulting from reference {0} results in an additional six cycle delay, and the subsequent write back of the result for reference {0} in cycle 11. However, with reference {4} referencing a different cache line, the L1 data cache is able to initiate processing of the cache miss to cache line B in the next cycle after the cache miss is initiated for cache line A. Consequently, the write back to reference {4} occurs one cycle later than for reference {4}, here cycle 12. Further, since both cache lines A and B have been retrieved into the cache, the processor will resume and process each additional reference {1,2,3,5} in sequence with no additional delay required to process a cache miss to another cache line. As a result, references {1,2,3,5 } are sequentially written back in the subsequent cycles to references {0,4}, resulting in a write back of the final reference for the complex memory instruction ($W_5$) occurring in cycle 16. Consequently, the six cycle delay that would otherwise be required to process the cache miss for cache line B with the conventional design is avoided. Performance in such situations is therefore substantially enhanced.

Alternative Implementations

A wide variety of alternate reordering methodologies may be used consistent with the invention. For example, as illustrated in FIG. 5, an alternate sequence of operations referenced at 78' may be used that merely generates in block 90 a reference for the last word in a range of memory addresses, then sequentially generates references for the remainder of the words in the same range in block 92. Such a methodology may find use, for example, in connection with environments where a complex memory access instruction is capable of spanning at most two cache lines.

In the PowerPC architecture, for example, the load/store multiple instruction transfers a range of memory addresses between memory and between a sequence of registers specified in the instruction. The last register is register 31, and the first register in the sequence is determined by subtracting the number of words in the requested range from 31. Thus, a load multiple instruction that requests a load of 10 consecutive words from memory would write those words into registers 22–31. Consequently, it may be desirable in such implementations to merely generate a reference for the last word (mapped to register 31) prior to sequentially generating references for the other words in the requested range. By initiating a cache access to the last word, if the access misses a different cache line than the cache line for the first word in the range, retrieval of that different cache line will potentially be commenced earlier, thereby minimizing the overall latency of the group of requests.

Other methodologies that increase the likelihood that a potential cache miss will be initiated earlier than through a purely sequential order may also be used. For example, a round-robin methodology could be used, with a reference from a different cache line generated each cycle, e.g., following the general order:

0, n, 2n, . . . M, 1, n+1, 2n+1, . . . M+1, 2, n+2, 2n+2. . . , M+2, . . .

Another potential methodology is a random ordering, among others that will be apparent to one of ordinary skill in the art having the benefit of the instant disclosure. Furthermore, it should be appreciated that a selection or ordering criteria need not be based explicitly on what cache line a particular reference is in. For example, it may be simpler in some instances to select a reference near the end of a sequence, or a predetermined offset from a particular point in the sequence, since the likelihood may increase that doing so selects a reference from another cache line than the first.

Moreover, in the illustrated invention, the complex memory access decoder implements the request reordering logic circuitry that orders requests in a manner consistent with the invention. It should be appreciated, however, that request reordering logic circuitry may be disposed in other components in the system processor to implement the ordering of requests at times other than during decoding. For example, in other embodiments, request reordering logic circuitry consistent with the invention may be disposed as a separate unit, or within any of an instruction fetch unit, a decode unit, an execution unit, and/or any other components that implement the fetching, dispatch, issue and/or execution stages of a processor.

As another alternative reordering consistent with the invention may be performed for other memory access requests than those generated in response to a complex memory access instruction, e.g., any sequence or grouping of access requests, whether or not forming a contiguous group of requested memory addresses. Moreover, it is not necessary for reordering to be performed in hardware. Rather, software may be utilized to implement reordering consistent with the invention.

Figure 6:
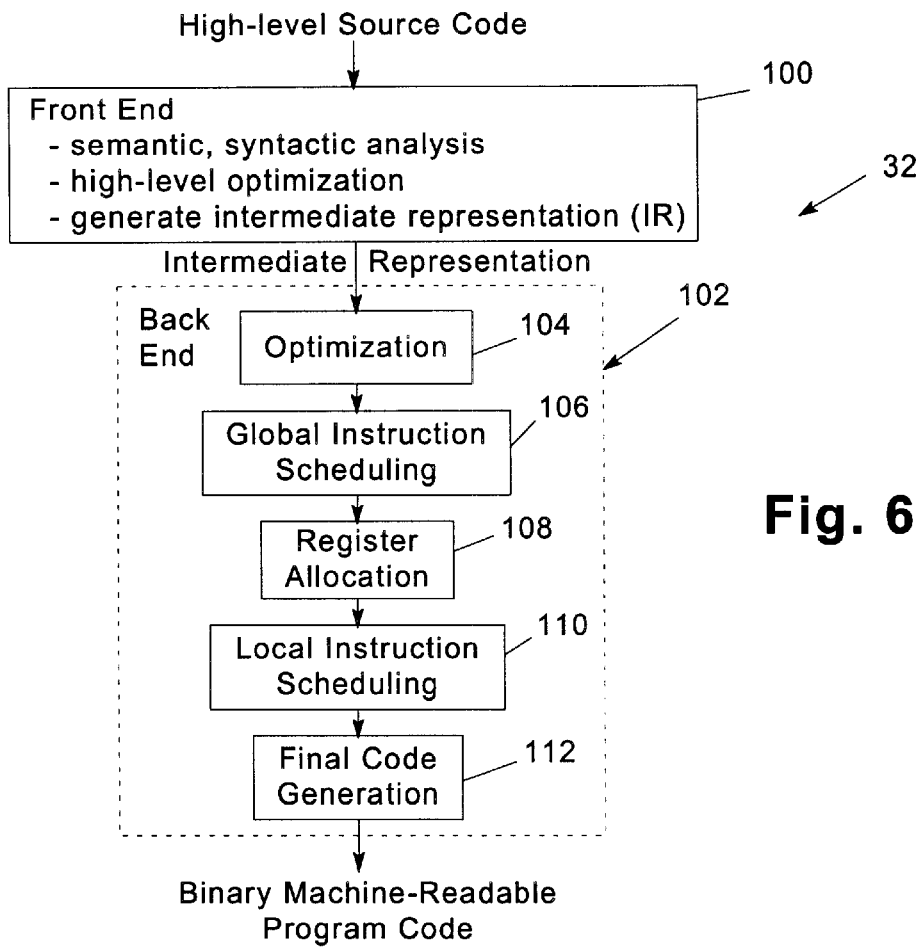
FIG. 6 is a block diagram of a compiler computer program consistent with the invention.
Figure 7:
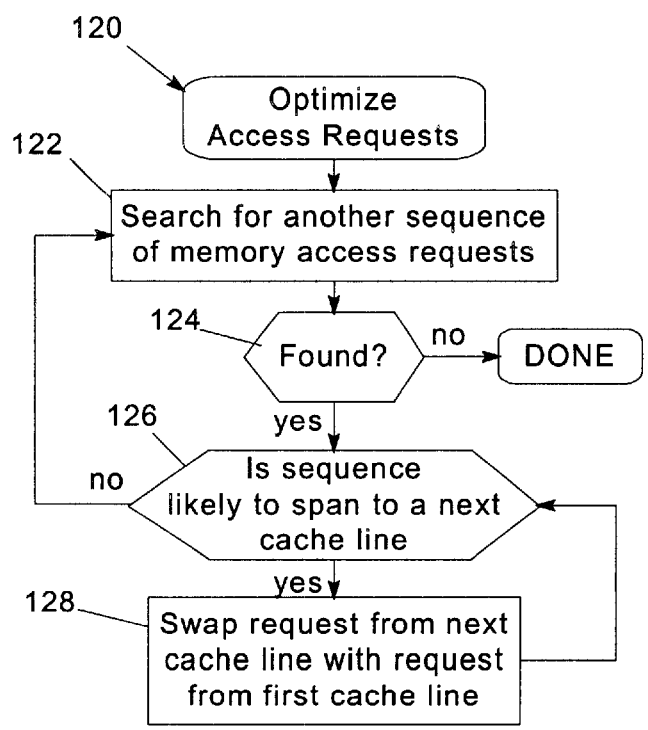
FIG. 7 is a flowchart illustrating the program flow of an optimize access requests routine executed by the compiler computer program of FIG. 6.

For example, as shown in FIGS. 6 and 7, sequences or groups of instructions may be analyzed and reordered, e.g., during compilation of a computer program, so that the performance of a conventional data processing system can be enhanced without any particular hardware improvements. FIG. 6 illustrates a compiler 32 that includes a front end 100 and a back end 102. Front end 100 handles conventional operations such as semantic and syntactic analysis and high-level optimization. In addition, the front end generates an intermediate representation (IR) from the high-level source code of the computer program being compiled.

The back end 102 of compiler 32 performs a number of conventional optimizations, as illustrated at block 104. In addition, global instruction scheduling is performed at block 106, followed by register allocation at block 108, local instruction scheduling at 110 and final code generation at 112, from which a binary machine-readable program code is output.

FIG. 7 illustrates a optimize access requests routine 120 executed by compiler 32, e.g., within any of blocks 104, 106 or 110 of FIG. 6. Routine 120 analyzes an intermediate representation of a computer program to locate and analyze sequences of memory access requests to reduce overall access latency for the program.

Routine 120 begins in block 122 by searching through the intermediate representation to locate a sequence of memory access requests, e.g., any grouping of memory access requests to a contiguous range of memory addresses, and which can be rearranged without impermissibly modifying the logic flow of the program. Control then passes to block 124 to determine whether any such sequence was found, and if so, control passes to block 126 to determine whether the sequence is likely to span into a second cache line. If not, no optimization is performed, and control returns to block 122 to search for another sequence. If so, however, control passes to block 128 to swap a request from the second cache line with a request from the first cache line. Control then returns to block 122 to search for another sequence. When all sequences have been found, block 124 terminates the routine.

As another alternative, rather than searching for a sequence of memory access requests, a routine consistent with the invention may search for groupings of requests, not necessarily directed to contiguous memory addresses, that are capable of being reordered without modifying the logic flow of the program. Then, based upon whether certain requests were directed to the same or different cache lines, the requests could be reordered to accelerate initiation of cache accesses for different cache lines, and thereby reduce the latency of any potential cache misses.

Other modifications will become apparent to one of ordinary skill in the art. Therefore, the invention lies in the claims hereinafter appended.

What is claimed is:

1. A method of accessing data in a multi-level memory architecture of the type including at least first and second levels of memory, wherein data in at least the first level of memory is arranged in blocks, the method comprising:

(a) processing a first memory access request; and (b) after processing the first memory access request, processing a second memory access request prior to processing a third memory access request based upon whether the third memory access request is for data maintained in the same block as data requested by the first memory access request.

2. The method of claim 1, wherein the first level of memory includes a cache memory, wherein each block corresponds to a cache line in the cache memory.

3. The method of claim 1, wherein processing the second memory access request prior to processing the third memory access request is further based upon whether the second memory access request is for data in a different block than the data requested by the first memory access request.

4. A method of accessing data in a multi-level memory architecture of the type including at least first and second levels of memory, wherein data in at least the first level of memory is arranged in blocks, the method comprising:

(a) processing a first memory access request; and (b) after processing the first memory access request, processing a second memory access request prior to processing a third memory access request based upon whether the third memory access request is for data maintained in the same block as data requested by the first memory access request;

wherein the first and second memory access requests miss the first level of memory, the method further comprising processing the miss for the second memory access request during processing of the miss for the first memory access request.

5. A method of accessing data in a multi-level memory architecture of the type including at least first and second levels of memory, wherein data in at least the first level of memory is arranged in blocks, the method comprising:

(a) processing a first memory access request; and (b) after processing the first memory access request, processing a second memory access request prior to processing a third memory access request based upon whether the third memory access request is for data maintained in the same block as data requested by the first memory access request;

wherein the second memory access request is for data accessed at a higher memory address than that for the third memory access request.

6. The method of claim 1, further comprising:

(a) receiving a complex memory instruction that references a plurality of contiguous words in the multi-level memory architecture, the plurality of contiguous words spanning a plurality of blocks, wherein the first, second and third memory access requests are each for at least one of the plurality of contiguous words, the first and second memory access requests for words in different blocks; and (b) processing the complex memory instruction, including issuing the first memory access request, thereafter issuing the second memory access request, and thereafter issuing the third memory access request.

7. The method of claim 1, wherein the first, second and third memory access requests are processed responsive to execution of a computer program, the method further comprising determining whether the third memory access request is likely to be for data maintained in the same block as data requested by the first memory access request.

8. The method of claim 7, wherein determining whether the third memory access request is likely to be for data maintained in the same block as data requested by the first memory access request is performed during compilation of the computer program.

9. The method of claim 7, wherein determining whether the third memory access request is likely to be for data maintained in the same block as data requested by the first memory access request is performed during execution of the computer program.

10. The method of claim 1, further comprising fetching the third memory access request prior to fetching the second memory access request, wherein processing the second memory access request prior to processing the third memory access request includes reordering the second and third memory access requests such that the second memory access request is processed prior to processing the third memory access request.

11. A method of accessing data in a multi-level memory architecture of the type including at least one cache, wherein data is arranged in cache lines in the cache, each cache line capable of storing a plurality of contiguous words, the method comprising:

(a) receiving a complex memory instruction that references a plurality of contiguous words in the multi-level memory architecture, the plurality of contiguous words spanning a plurality of cache lines including at least first and second cache lines; and (b) processing the complex memory instruction by processing a memory access request for at least one word in the plurality of contiguous words that is arranged in a cache line other than the first cache line, prior to processing memory access requests for all of the words in the plurality of contiguous words that are arranged in the first cache line.

12. The method of claim 11, wherein processing the complex memory instruction includes issuing in round robin fashion memory access requests for words in the plurality of contiguous words that are maintained in each of the plurality of cache lines.

13. The method of claim 11, wherein processing the complex memory instruction includes processing a memory access request for at least one word in the plurality of contiguous words that is arranged in a cache line other than the first cache line, prior to processing a memory access request for any of the words in the plurality of contiguous words that are arranged in the first cache line.

14. A method of accessing data in a multi-level memory architecture of the type including at least one cache, wherein data is arranged in cache lines in the cache, each cache line capable of storing a plurality of contiguous words, the method comprising:

(a) receiving a complex memory instruction that references a plurality of contiguous words in the multi-level memory architecture, the plurality of contiguous words spanning a plurality of cache lines including at least first and second cache lines; and (b) processing the complex memory instruction by processing a memory access request for at least one word in the plurality of contiguous words that is arranged in a cache line other than the first cache line, prior to processing memory access requests for all of the words in the plurality of contiguous words that are arranged in the first cache line, wherein processing the complex memory instruction includes:

(i) processing a memory access request for a last word among the plurality of contiguous words; and (ii) thereafter processing in sequence at least one memory access request for each additional word in the plurality of contiguous words starting with the first word in the plurality of contiguous words.

15. A circuit arrangement configured to access data in a multi-level memory architecture of the type including at least first and second levels of memory, wherein data in at least the first level of memory is arranged in blocks, the circuit arrangement comprising:

(a) an execution unit configured to execute memory access requests to access data in the multi-level memory architecture; and (b) request reordering logic circuitry configured to order the execution of first, second and third memory access requests by the execution unit, the request reordering logic circuitry configured to order the first memory access request to be executed prior to the second and third memory access requests, and to order the second memory access request to be executed prior to the third memory access request based upon whether the third memory access request is for data maintained in the same block as data requested by the first memory access request.

16. The circuit arrangement of claim 15, further comprising issue logic circuitry, coupled to the execution unit, the issue logic circuitry configured to issue memory access requests to the execution unit for execution thereby, wherein the request reordering logic circuitry is disposed in at least one of the execution unit and the issue logic circuitry.

17. The circuit arrangement of claim 15, further comprising decode logic circuitry, coupled to the execution unit, the decode logic circuitry configured to receive a complex memory access instruction and to generate memory access requests responsive thereto, wherein the request reordering logic circuitry is disposed in the decode logic circuitry.

18. The circuit arrangement of claim 15, wherein the request reordering logic circuitry is configured to order the execution of first, second and third memory access requests by reordering the memory access requests relative to an initial order in which the memory access requests are received by the request reordering logic circuitry.

19. The circuit arrangement of claim 15, wherein the request reordering logic circuitry is configured to order the execution of first, second and third memory access requests by generating the memory access requests in a predetermined order.

20. The circuit arrangement of claim 15, wherein the first level of memory includes a cache memory, wherein each block corresponds to a cache line in the cache memory.

21. The circuit arrangement of claim 15, wherein the request reordering logic is further configured to order the second memory access request to be executed prior to the third memory access request based upon whether the second memory access request is for data in a different block than the data requested by the first memory access request.

22. A circuit arrangement configured to access data in a multilevel memory architecture of the type including at least first and second levels of memory, wherein data in at least the first level of memory is arranged in blocks, the circuit arrangement comprising:
  (a) an execution unit configured to execute memory access requests to access data in the multi-level memory architecture; and
  (b) request reordering logic circuitry configured to order the execution of first, second and third memory access requests by the execution unit, the request reordering logic circuitry configured to order the first memory access request to be executed prior to the second and third memory access requests, and to order the second memory access request to be executed prior to the third memory access request based upon whether the third memory access request is for data maintained in the same block as data requested by the first memory access request, wherein the second memory access request is for data accessed at a higher memory address than that for the third memory access request.

23. An integrated circuit device comprising the circuit arrangement of claim 15.

24. A data processing system comprising the circuit arrangement of claim 15.

25. A program product, comprising a hardware definition program that defines the circuit arrangement of claim 15; and a signal bearing media bearing the hardware definition program, the signal bearing media including at least one of a transmission type media and a recordable media.

26. An apparatus, comprising:
  (a) a multi-level memory architecture of the type including at least first and second levels of memory, wherein data in at least the first level of memory is arranged in blocks; and
  (b) a processor coupled to the multi-level memory architecture, the processor including:
    (1) an execution unit configured to execute memory access requests to access data in the multi-level memory architecture; and
    (2) request reordering logic circuitry configured to order the execution of first, second and third memory access requests by the execution unit, the request reordering logic circuitry configured to order the first memory access request to be executed prior to the second and third memory access requests, and to order the second memory access request to be executed prior to the third memory access request based upon whether the third memory access request is for data maintained in the same block as data requested by the first memory access request.

27. The apparatus of claim 26, wherein the first level of memory includes a pipelined cache memory configured to process a miss generated responsive to the second memory access request during processing of a miss generated responsive to the first memory access request.

28. A circuit arrangement configured to access data in a multilevel memory architecture of the type including at least first and second levels of memory, wherein data in at least the first level of memory is arranged in blocks, the circuit arrangement comprising:
  (a) an execution unit configured to execute memory access requests to access data in the multi-level memory architecture; and
  (b) request reordering logic circuitry configured to order the execution of first, second and third memory access requests by the execution unit, the request reordering logic circuitry configured to order the first memory access request to be executed prior to the second and third memory access requests, and to order the second memory access request to be executed prior to the third memory access request based upon whether the third memory access request is for data maintained in the same block as data requested by the first memory access request, wherein the first and second memory access requests miss the first level of memory, the request reordering logic circuitry further configured to process the miss for the second memory access request during processing of the miss for the first memory access request.

* * * * *